United States Patent [19]

Sugizaki et al.

[11] Patent Number: 5,540,373
[45] Date of Patent: Jul. 30, 1996

[54] PINCH ROLLER TYPE TAPE DRIVE

[75] Inventors: Yasuo Sugizaki; Akira Suzuki; Shigeru Masuda, all of Kanagawa, Japan

[73] Assignee: Sony Corporation, Tokyo, Japan

[21] Appl. No.: 979,436

[22] Filed: Nov. 20, 1992

Related U.S. Application Data

[63] Continuation of Ser. No. 666,852, Mar. 8, 1991, abandoned.

[30] Foreign Application Priority Data

Mar. 13, 1990 [JP] Japan .................................. 2-62183

[51] Int. Cl.⁶ .................................................. B65H 20/00
[52] U.S. Cl. ............................ 226/181; 226/186; 492/56
[58] Field of Search ................................. 226/181, 186, 226/187; 492/56

[56] References Cited

U.S. PATENT DOCUMENTS

| | | | |
|---|---|---|---|
| 2,788,209 | 4/1957 | Montijo, Jr. ............................ | 226/186 |
| 2,848,221 | 8/1958 | Camras ............................ | 226/186 X |
| 3,310,214 | 3/1967 | Nesin ............................ | 226/181 |
| 3,402,868 | 9/1968 | Hammond ............................ | 226/181 X |
| 3,685,443 | 8/1972 | Kusters ............................ | 492/56 X |
| 3,686,731 | 8/1972 | Koori et al. ............................ | 492/56 |
| 3,828,996 | 8/1974 | Warren ............................ | 226/168 |
| 4,078,286 | 3/1978 | Takiguichi et al. ............................ | 492/56 |
| 4,149,797 | 4/1979 | Imperial ............................ | 492/56 X |
| 4,198,739 | 4/1980 | Budinger et al. ............................ | 492/56 |
| 4,310,863 | 1/1982 | Lelandais ............................ | 226/189 |
| 4,465,388 | 8/1984 | Iwasawa ............................ | 400/235.1 |
| 4,522,866 | 6/1985 | Nishikawa et al. ............................ | 492/56 X |
| 4,550,478 | 11/1985 | Olcott, Jr. ............................ | 492/56 |
| 4,632,855 | 12/1986 | Conlon et al. ............................ | 492/56 X |
| 4,883,715 | 11/1989 | Kuge et al. ............................ | 492/56 X |
| 5,123,151 | 6/1992 | Uehara et al. ............................ | 492/56 |

*Primary Examiner*—John P. Darling
*Attorney, Agent, or Firm*—Ronald P. Kananen

[57] ABSTRACT

A pinch roller type tape drive for driving a magnetic tape on a VTR or the like comprises a capstan for driving the magnetic tape, and a pinch roller for pressing the magnetic tape against the circumference of the capstan so that the magnetic tape may not slip relative to the circumference of the capstan. The outermost layer of the pinch roller is formed of an elastic material having a hardness higher than that of rubber, which is used for forming the outermost layer of a conventional pinch roller. The pinch roller is capable of pressing the magnetic tape against the circumference of the capstan at a sufficient pressure without contacting the circumference of the capstan.

13 Claims, 5 Drawing Sheets

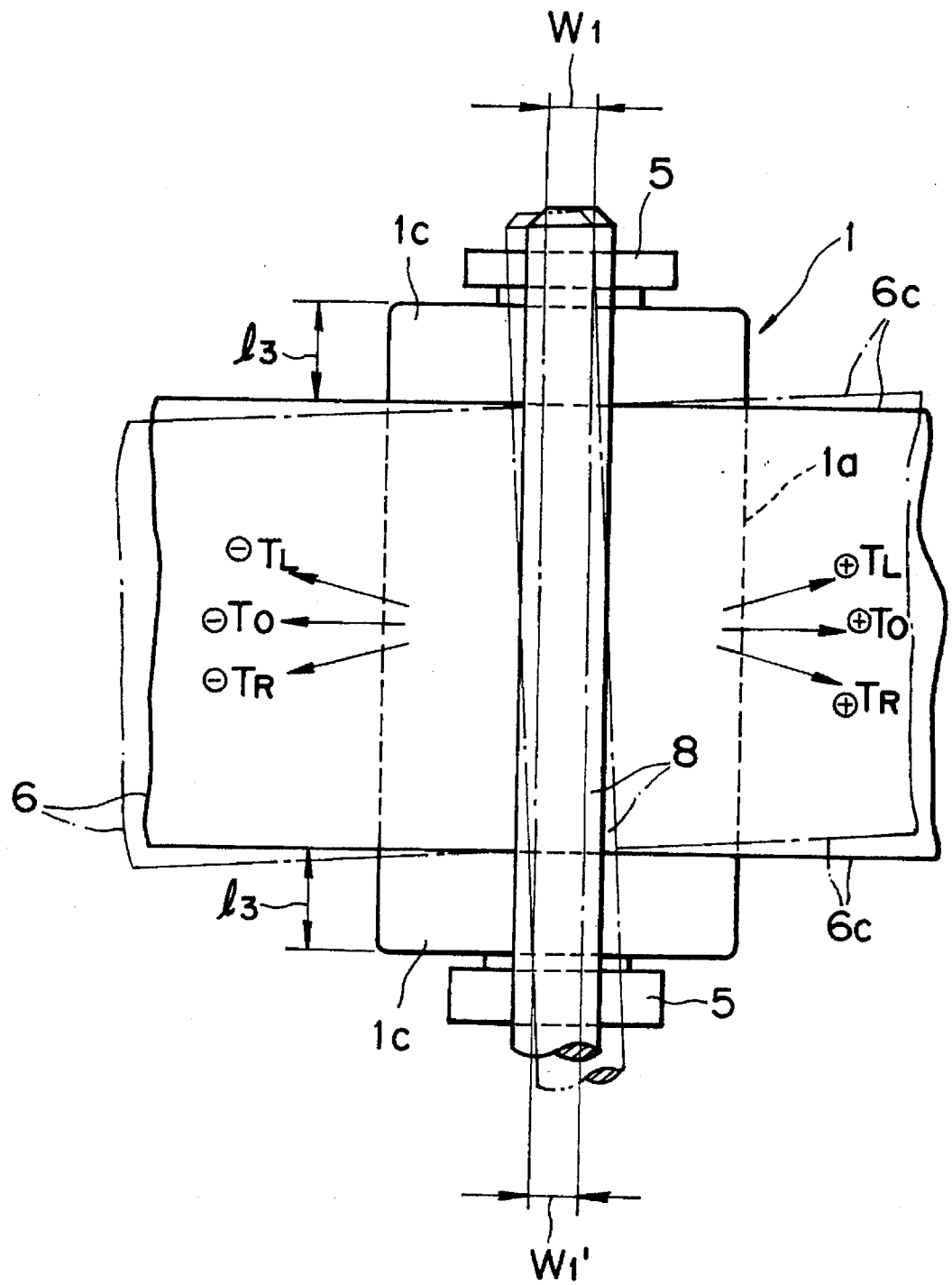

PINCH ROLLER TYPE TAPE DRIVE

This application is a continuation of application Ser. No. 07/666,852 filed Mar. 8, 1991, abandoned.

BACKGROUND OF THE INVENTION

1. Field of the Invention

The present invention relates generally to an information recording and reproducing apparatus, such as a VTR (video tape recorder), and, more particularly, to a pinch roller type tape drive for such an information recording and reproducing apparatus.

2. Description of the Prior Art

FIGS. 6 to 8 show a conventional pinch roller type tape drive incorporated into a VTR. The tape drive comprises a pinch roller 1, and a capstan 8. The pinch roller 1 comprises a pinch roller shaft 4 provided at its opposite ends with flanges 5, a core sleeve 2 rotatably supported at its opposite ends on bearings 3 on the pinch roller shaft 4, and a rubber coat 1a coating the circumference of the core sleeve 2. The working length $l_1$ of the pinch roller 1 is sufficiently greater than the width $l_2$ of a magnetic tape 6. A pinch roller pressing member 7 presses the pinch roller 1 at the flanges 5 to apply a pressure T on the order of 4 to 5 kg for a VTR to press the pinch roller 1 elastically against the capstan 8 to pinch the magnetic tape 6 between the pinch roller 1 and the capstan 8 at the pressure T.

When the pinch roller 1 is thus pressed, a depression 1b of a depth substantially corresponding to the thickness t of the magnetic tape 6 is formed in a central portion of the rubber coat 1a in contact with the magnetic tape 6, and the upper and lower end portions 1c of the rubber coat 1a each of a length $l_3=(l_1-l_2)/2$ extending respectively beyond the upper and lower edges 6c of the magnetic tape 6 are pressed against the capstan 8 in relatively large widths of contact area $W_1$ at the upper edge of the magnetic tape 6 and $W_1'$ at the lower edge of the magnetic tape 6. The pinch roller 1 is driven frictionally for rotation by the capstan 8 through the frictional engagement of the upper and lower end portions 1c of the pinch roller 1 and the capstan 8. Consequently, the magnetic tape 6 is driven for running by the combined effect of a frictional driving force applied by the capstan 8 to one surface 6a of the magnetic tape 6 and a frictional driving force applied by the pinch roller 1 to the other surface 6b of the same.

The rubber coat 1a of the pinch roller 1 is inevitably subject to chemical degradation, abrasion and compressive deformation, and hence the depression 1b will grow progressively into a permanent circumferential groove, so that the pressure applied to the magnetic tape 6 by the depression 1b of the pinch roller 1 decreases in the long run below the normal pressure T even if pinch roller 1 is pressed against the capstan 8 by the normal pressure T. Consequently, the magnetic tape 6 may possibly slip relative to the capstan 8, and the pinch roller 1 needs to be replaced with a new one when such a permanent depression is formed in the rubber coat 1a.

The upper and lower end portions 1c of the pinch roller 1 coated with the rubber coat 1a are in contact with the capstan 8 in comparatively large widths of contact area $W_1$ and $W_1'$, which are dependent on the pressure T and the hardness of a rubber material forming the rubber coat 1a, so that the pinch roller 1 is rotated by the capstan 8 to drive the magnetic tape 6 together with the capstan 8. Accordingly, if the pinch roller 1 and the capstan 8 are misaligned, the widths of contact area $W_1$ and $W_1'$ of the upper and lower end portions 1c of the pinch roller 1 are greatly different from each other, and there by the magnetic tape 6 will be caused to run in a direction $T_L$ or $T_R$ (FIG. 8) deviating from the normal running direction $T_0$, so that the edges of the magnetic tape 6 are damaged by tape guides.

SUMMARY OF THE INVENTION

Accordingly, it is an object of the present invention to provide a pinch roller type tape drive capable of ensuring the stable running of a magnetic tape.

In one aspect of the present invention, a pinch roller type tape drive comprises a capstan, and a pinch roller having a circumferential layer formed of an elastic material having a hardness higher than that of a material generally used for forming the circumferential layer of a conventional pinch roller and capable of pressing a magnetic tape against the capstan without contacting the circumference of the capstan.

When the pinch roller presses a magnetic tape against the capstan, the circumference of the pinch roller is deformed scarcely, a gap of a width substantially equal to the thickness of the magnetic tape is formed between the respective circumferences of the pinch roller and the capstan, and the pinch roller and the magnetic tape are in contact with each other along a line, and the magnetic tape and the capstan are in contact with each other along a line. Accordingly, the magnetic tape is held firmly in contact with the capstan, the magnetic tape is driven for running in a correct direction, the useful life of the pinch roller is extended, and the pinch roller type tape drive can be formed in a relatively small size because the length of the pinch roller may substantially be the same as the width of the magnetic tape.

BRIEF DESCRIPTION OF THE DRAWINGS

The above and other objects, features and advantages of the present invention will become more apparent from the following description taken in connection with the accompanying drawings, in which:

FIG. 8 is a side view taken in the direction of arrows along line VIII—VIII in FIG. 7,

DESCRIPTION OF THE PREFERRED EMBODIMENTS

Figure 6:
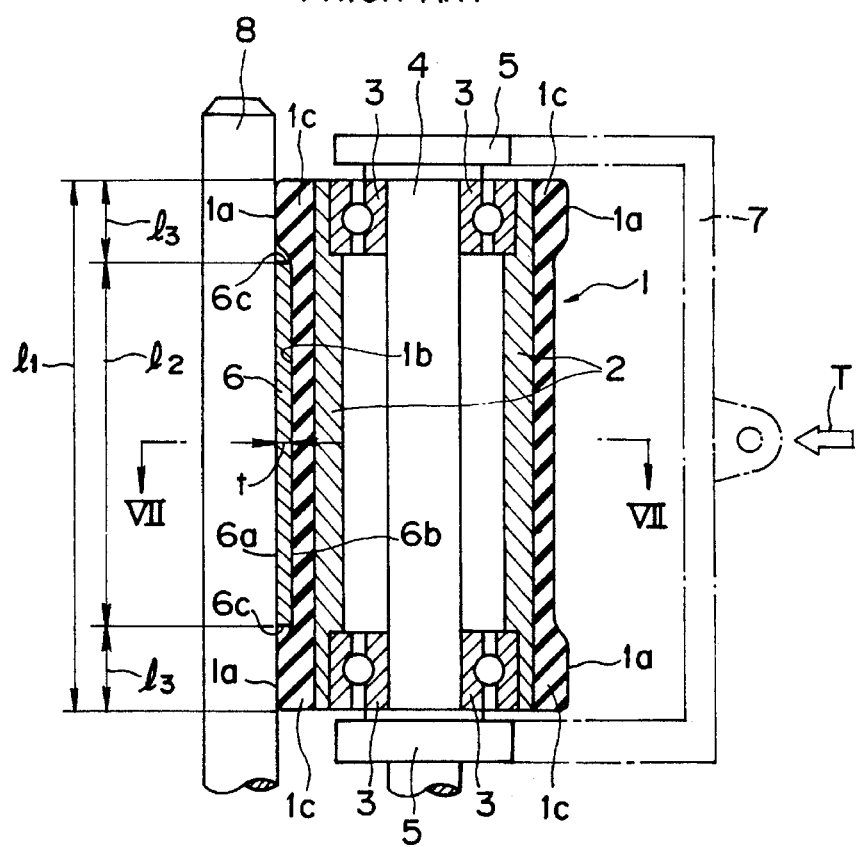
FIG. 6 is a sectional view of a conventional pinch roller type tape drive.
Figure 7:
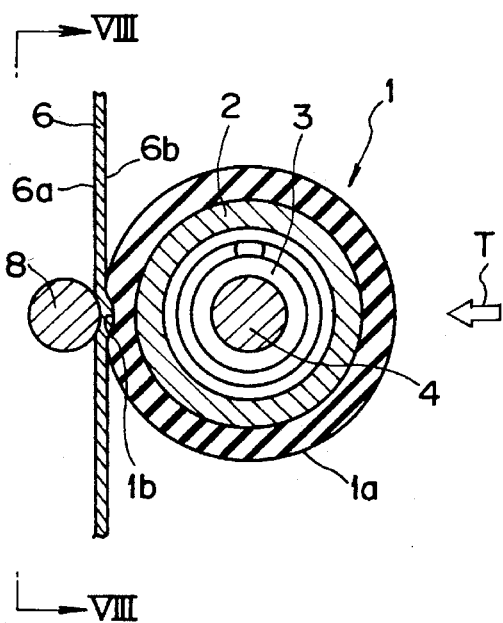
FIG. 7 is a sectional view taken on line VII—VII in FIG. 6.

The present invention will be described hereinafter as applied to a pinch roller type tape drive incorporated into a VTR, in which parts like or corresponding to those of the conventional pinch roller type tape drive previously described with reference to FIGS. 6 to 8 are denoted by the same reference characters and the description thereof will be omitted to avoid duplication.

Referring to FIGS. 1 to 4, a pinch roller type tape drive in a preferred embodiment according to the present invention comprises a capstan 8 and a pinch roller 11.

The pinch roller 11 comprises a pinch roller shaft 4, a core sleeve 2 supported on bearings 3 on the pinch roller shaft 4, and elastic coat 11a coating the metal core sleeve 2.

The elastic coat 11a is formed of a material having a hardness higher than that of a conventional rubber material having a hardness in the range of SH A 50 to SH A 70, and having a coefficient of friction between the elastic coat 11a and an ordinary magnetic tape higher than that in the range of about 0.5 to about 0.6 between the conventional rubber material and an ordinary magnetic tape in the range of about 0.5 to about 0.6, such as a thermoplastic polyester having a hardness of about SH A 95, which is approximately the middle of a range between the hardness of the conventional rubber material, and that of a metal or a plastic, and a coefficient of static friction of about 0.75 between the thermoplastic polyester and an ordinary magnetic tape. The thermoplastic polyester is far less subject to chemical degradation, abrasion and compressive deformation than the conventional rubber material, and the useful life of the pinch roller 11 having the elastic coat 11a formed of the thermoplastic polyester is longer than that of the conventional pinch roller 1 (FIG. 6) having the rubber coat 1a formed of the conventional rubber material.

The working length $l_4$ of the pinch roller 11 is slightly greater than the width $l_2$ of the magnetic tape 6 and is far smaller than the working length $l_1$ of the conventional pinch roller 1.

When a pressure T in the range of 4 to 5 kg is applied to the pinch roller 11 to press the magnetic tape 6 against the capstan 8, the circumference of the pinch roller 11 is hardly deformed, so that small gaps 12 of a width substantially equal to the thickness t of the magnetic tape 6 are formed between the upper margin of the pinch roller 11 extending beyond the upper edge of the magnetic tape 6 and the capstan 8 and between the lower margin of the pinch roller 11 extending beyond the lower edge of the magnetic tape 6 and the capstan 8, respectively. Thus, the pinch roller 11 is able to press the magnetic tape 6 against the capstan 8 at the normal pressure T in the range of 4 to 5 kg without contacting the capstan 8.

Since the circumference of the elastic coat 11a of the pinch roller 11 and the magnetic tape 6 are in contact with each other substantially along a line, and the circumference of the capstan 8 and the magnetic tape 6 are in contact with each other substantially along a line, the widths of contact area $W_2$ and $W_2'$ between the circumference of the pinch roller 11 and the magnetic tape 6 is far less than the widths of contact area $W_1$ and $W_1'$ (FIG. 8) between the circumference of the rubber coat 1a of the conventional pinch roller 1 and the magnetic tape 6.

In driving the magnetic tape 6 by the pinch roller type tape drive, the magnetic tape 6 is pressed by the pinch roller 11 at the pressure T against the capstan 8 to drive the magnetic tape 6 frictionally by the capstan 8. The pinch roller 11 is driven frictionally for rotation by the magnetic tape 6. Since the pressure T applied by the pinch roller 11 to the magnetic tape 6 is concentrated on the line of contact, the effective friction between pinch roller 11 and the magnetic tape 6, and the effective friction between the capstan 8 and the magnetic tape 6 are very large. Accordingly, the magnetic tape 6 hardly slips relative to the pinch roller 11 as well as relative to the capstan 8.

Since the widths of contact area $W_2$ and $W_2'$ are very small, the difference between the widths of contact area $W_2$ at the upper edge of the magnetic tape 6 and $W_2'$ at the lower edge of the magnetic tape 6 attributable to the misalingment of the pinch roller 11 with respect to the capstan 8 is very small. Therefore, the pinch roller type tape drive is able to drive the magnetic tape 6 correctly for running in the normal direction $T_0$ so that the upper and lower edges 6c of the magnetic tape 6 may not be damaged by the tape guides.

Experiments were conducted to measure the frictional resistance against the slip of the magnetic tape 6 relative to the capstan 8, and the abrasion of the conventional pinch roller 1 and that of the pinch roller 11 of the present invention. The measured results showed that the frictional resistance was about 450 g when the conventional pinch roller 1 is used, and was about 800 g when the pinch roller 11. The abrasion of the pinch rollers 1 and 11 after the use of several hundreds hours was in the range of 10 to 15 μm for the pinch roller 1, and the pinch roller 11 was scarcely abraded.

Figure 1:
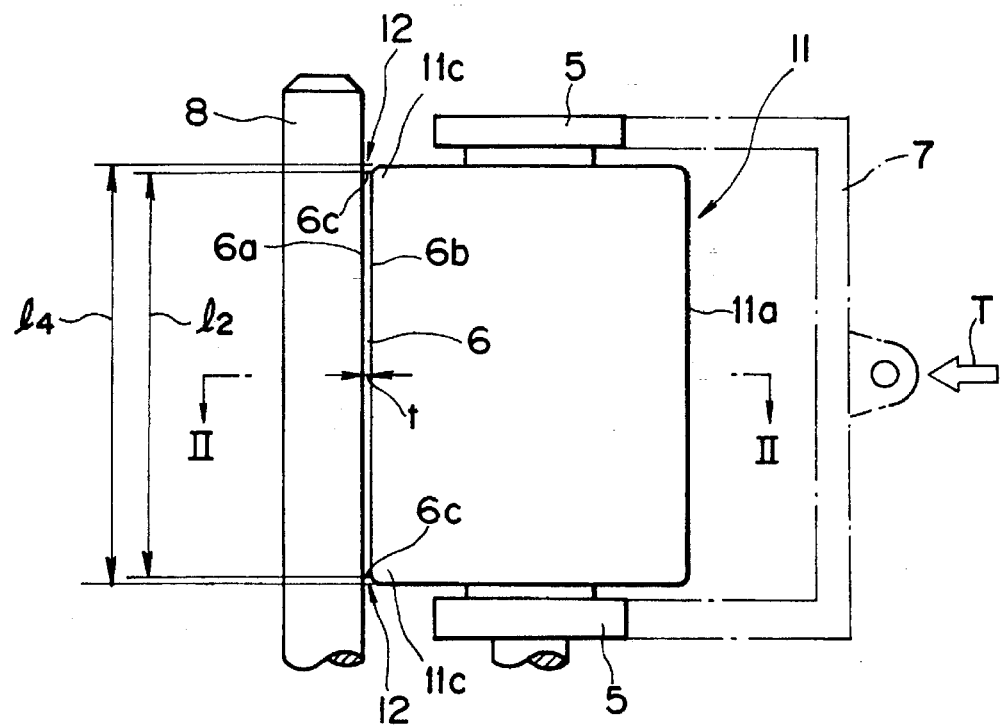
FIG. 1 is a side elevation of a pinch roller type tape drive in a preferred embodiment according to the present invention.
Figure 2:
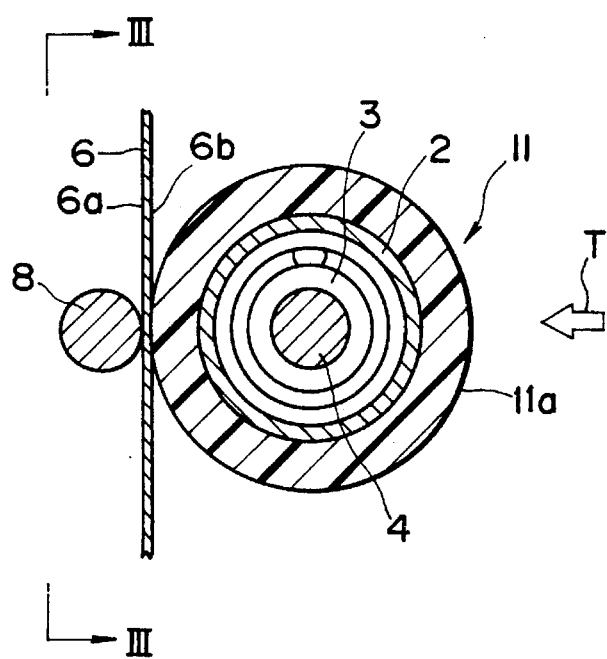
FIG. 2 is a sectional view taken on line II—II in FIG. 1.
Figure 3:
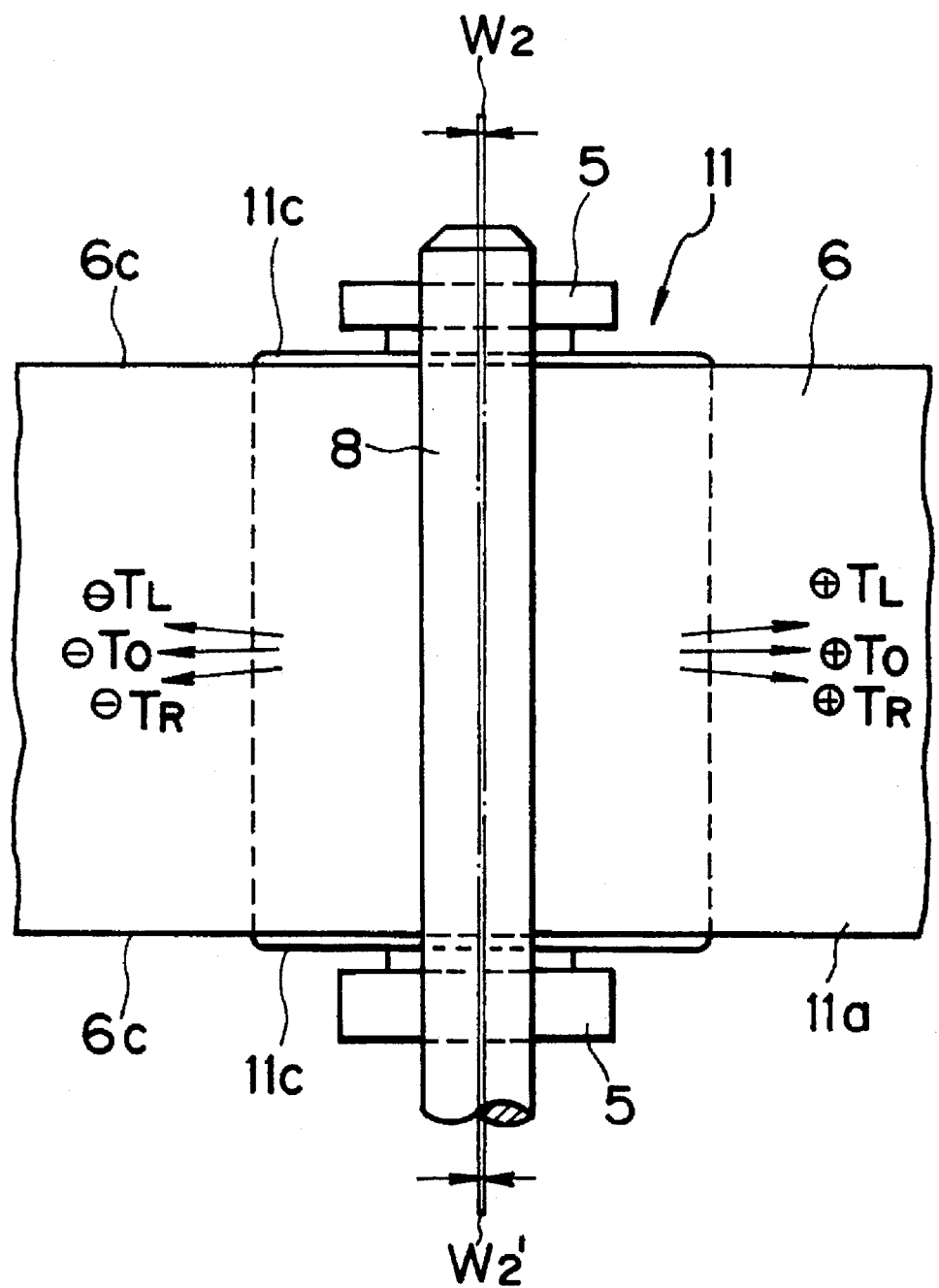
FIG. 3 is a side view taken in the direction of arrows along line III—III in FIG. 2.
Figure 4:
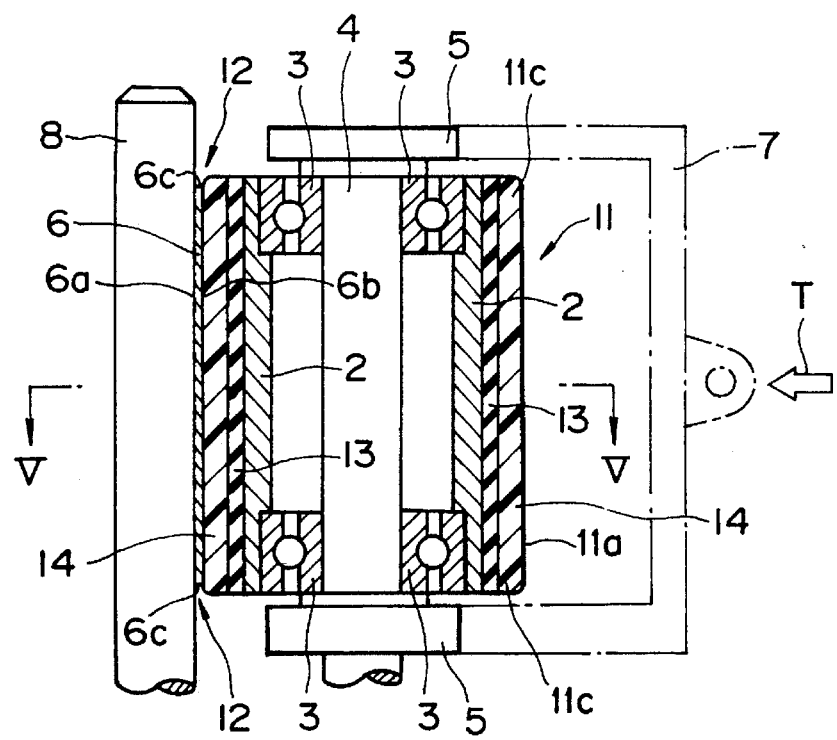
FIG. 4 is a sectional view of a modification of the pinch roller type tape drive of FIG. 1.
Figure 5:
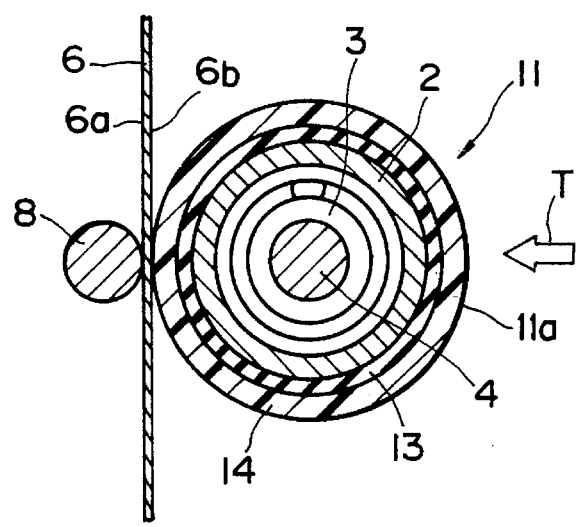
FIG. 5 is a sectional view taken on line V—V in FIG. 4.

FIGS. 4 and 5 show a modification of the pinch roller 11. In this modification, a pinch roller 11 comprises a pinch roller shaft 4, a core sleeve 2 supported on bearings 3 on the pinch roller shaft 4, an inner coat 13 coating the circumference of the core sleeve 2 and formed of a material having a relatively low hardness, such as rubber, and an elastic coat 14 coating the circumference of the inner coat 13 and formed of an elastic material having a hardness higher than that 0f rubber, such as a thermoplastic polyester.

The present invention is applicable to a pinch roller type tape drive for various equipments including tape recorders other than the VTR.

Although the invention has been described in its preferred forms with a certain degree of particularity, obviously many changes and variations are possible therein. It is therefore to be understood that the present invention may be practiced otherwise than as specifically described herein without departing the scope and spirit thereof.

What is claimed is:

1. A pinch roller type tape drive for driving a tape-shaped information recording medium having a width, comprising:

a capstan having a driving surface for frictionally driving the tape-shaped information recording medium;

a pinch roller having a working length which is slightly greater than the width of the tape-shaped information recording medium, said pinch roller pressing the tape-shaped information recording medium against the capstan and having an elastic circumferential member of a Shore hardness A of 70 or higher forming a circumference of the pinch roller; and pinch roller pressing means supporting the pinch roller and capable of pressing the pinch roller against the capstan, wherein the pinch roller pressing means presses the pinch roller against the capstan with the width of the tape-shaped information recording medium therebetween so that the circumference of the pinch roller is not in contact with the driving surface of the capstan and the circumference of the pinch roller is hardly deformed since said pressing and said pinch roller extends slightly beyond the width of said tape-shaped recording medium in opposing directions without contacting said capstan.

2. The pinch roller type tape drive according to claim 1, wherein the elastic, circumferential member of said pinch roller is formed of an elastic, thermoplastic polyester.

3. The pinch roller type tape drive according to claim 1, wherein said elastic circumferential member of said pinch roller comprises an outer layer, which surrounds a metal core.

4. The pinch roller type tape drive according to claim 1, wherein said pinch roller has an inner core that is encased by an outer layer, said outer layer being formed of a thermoplastic polyester having a coefficient of static friction of approximately 0.75 between the outer layer and the tape-shaped information recording medium.

5. The pinch roller type tape drive according to claim 1, wherein said elastic circumferential member has a Shore hardness A of 95.

6. A pinch roller type tape drive for driving a tape-shaped information recording medium having a width, comprising:

a capstan having a driving surface for frictionally driving the tape-shaped information recording medium;

a pinch roller having a length which is greater than the width of the tape-shaped information recording medium, and having an elastic circumferential member of a Shore hardness A of 70 or higher forming a circumference of said pinch roller, and pinch roller pressing means supporting the pinch roller and capable of pressing the pinch roller against the capstan, wherein the pinch roller pressing means presses the elastic circumferential member of said pinch roller against the capstan with the width of the tape-shaped information recording medium therebetween so that the circumference of the pinch roller is not in contact with the driving surface of the capstan, and said elastic circumferential member of said pinch roller is hardly deformed by said pressing, so that portions of the length of said pinch roller which extend in opposing directions beyond the width of said tape-shaped recording medium are also not in contact with the capstan.

7. The pinch roller type tape drive according to claim 6, wherein said pinch roller has an inner core that is encased by an outer layer, said outer layer being formed of a thermoplastic polyester having a coefficient of static friction of approximately 0.75 between the outer layer and the tape-shaped information recording medium.

8. The pinch roller type tape drive according to claim 6, wherein said elastic circumferential member has a Shore hardness A of 95.

9. A pinch roller type tape drive for driving a tape-shaped information recording medium comprising:

a rotationally driven capstan for advancing said recording medium;

a pinch roller for pressing said recording medium against said rotationally driven capstan;

said pinch roller having an elastic coat of a Shore hardness greater than 70 covering its outside surface for ensuring that said pinch roller contacts only said recording medium and wherein said elastic coat prevents deformation and degradation of the pinch roller surface contacting said recording medium.

10. The pinch roller type tape drive according to claim 9 wherein said elastic coat and said recording medium have a coefficient of static friction of 0.75 between them for insuring a consistent advancement of the tape medium.

11. The pinch roller type tape drive according to claim 10 wherein said elastic coat is made of a thermoplastic polyester.

12. The pinch roller type tape drive according to claim 10, wherein said pinch roller further comprises a pinch roller shaft, bearings on said pinch roller shaft, a core sleeve supported on said bearings, an inner coat coating the circumference of said core sleeve, said inner coat having a Shore hardness less than that of said elastic coat, and said elastic coat covers said inner coat.

13. A pinch roller type tape drive according to claim 10, wherein said elastic coat has a Shore A hardness of 95.

* * * * *